United States Patent [19]
Richmond

[11] Patent Number: 5,090,441
[45] Date of Patent: Feb. 25, 1992

[54] ANTI-CLOG VALVE

[75] Inventor: James W. Richmond, Indianapolis, Ind.

[73] Assignee: Emerson Electric Co., St. Louis, Mo.

[21] Appl. No.: 642,032

[22] Filed: Jan. 16, 1991

[51] Int. Cl.⁵ .................... F16K 31/06; F15B 13/044
[52] U.S. Cl. ................. 137/242; 251/30.01; 251/30.02; 137/596.17; 137/870
[58] Field of Search ........ 251/30.01, 25, 30.02, 251/30.05; 137/242, 596.17, 870

[56] References Cited

U.S. PATENT DOCUMENTS

| | | | |
|---|---|---|---|
| 3,654,963 | 4/1972 | Ages | 251/30.01 X |
| 4,081,171 | 3/1978 | Morgan et al. | 251/30.01 X |
| 4,360,037 | 11/1982 | Kendall | 137/242 |

Primary Examiner—Arnold Rosenthal
Attorney, Agent, or Firm—Robert F. Meyer

[57] ABSTRACT

A pressure operated valve includes an inlet and an outlet connected by a main valve having a valve diaphragm member that communicates with an operating pressure chamber. A pilot valve inlet port and a pilot valve outlet port also communicate with the operating pressure chamber. The inlet port is configured in the form of four circular slits of 0.004 to 0.007 inches width. The slits are formed by four pins of a pilot valve insert which fit into four bores in a valve body. Each pin has a ridge on its surface parallel to the pin axis, which pin locates and spaces the pin in the bore to form the slit. The slits are located flush with wall of the main inlet so that water rushing through the inlet washes particles off the slit. The pilot valve outlet port is sealed by an armature comprising a ferromagnetic sleeve and a flexible rubber core. A groove in the core receives the end of a lever which seals the pilot valve inlet port whenever the pilot valve outlet port is open and vice versa.

8 Claims, 7 Drawing Sheets

ANTI-CLOG VALVE

BACKGROUND OF THE INVENTION

1. Field of the Invention

The invention in general relates to water valves, and in particular to such valves that are operated by water pressure and are electrically actuated.

2. Description of the Prior Art.

Electrically operated water valves have been used for generations in appliances such as washing machines. Such valves generally have a magnetically responsive armature that alternately turns the water supply on and off as determined by the appliance programming. In order that the armature and the electrical power requirements be kept reasonably small, such valves generally are pressure operated: one side of the main valve seal is open to a operating pressure chamber; the armature is used to open and close a pilot valve which alternately places the operating pressure chamber at inlet pressure and at the outlet pressure; the resulting change in pressure in the operating pressure chamber causes the main valve to open and close. By making the inlet port of the operating pressure chamber very small compared to the outlet port, the operating pressure chamber inlet can be left open and the pressure in the operating pressure chamber can be regulated solely by opening and closing the outlet port; that is, when the outlet port is closed, the operating pressure rises to that of the inlet and when the outlet port is closed, the pressure drops to essentially that of the outlet, since the outflow is so much greater than the inflow. This allows the valve to be more compact and simple, but also allows water to flow continuously through the inlet and outlet ports of the operating pressure chamber while the valve is open. Examples of such pressure-operated water valves are disclosed in U.S. Pat. Nos. 4,387,878 and 4,534,537 issued to Zukausky, U.S. Pat. No. 3,593,957 issued to Dolter, U.S. Pat. No. 3,630,482 issued to Beller, U.S. Pat. No. 3,655,163 issued to Rattan, U.S. Pat. No. 3,672,627 issued to McCarty, U.S. Pat. No. 3,872,878 issued to Kozel, and U.S. Pat. No. 4,174,824 issued to Kolze. It is also known to use pressure operated pilot valves to regulate gas flow. See for example U.S. Pat. No. 3,917,219 issued to Fred W. Hendrick. The gas valve disclosed in the Hendrick patent also allows fluid to flow continuously through the an inlet port to the operating pressure chamber while the valve is open. This combination of tiny operating pressure chamber inlet ports and continuous flow through the port while the valve is open tends to cause the inlet ports to clog.

SUMMARY OF THE INVENTION

It is an object of the invention to provide a pressure operated water valve that overcomes one or more of the disadvantages of prior art pressure operated water valves.

It is a further object to provide the above object in a pressure operated water valve that is much less subject to clogging than prior valves.

It is another object of the invention to provide one or more of the above objects in a pressure operated water valve in which water flows through the operating pressure chamber inlet port only for the short time during which the operating pressure chamber is reaching inlet pressure.

It is yet another object of the invention to provide a pressure operated water valve having an inlet port that resists clogging.

It is still a further object of the invention to provide a pressure operated water valve in which the flow of water while the valve is open tends to wash particles away from the operating pressure chamber inlet port.

It is still another object of the invention to provide one or more of the above objects in a pressure operate water valve in which the small inlet ports can be formed simply by molding and assembling the parts without additional operations.

The invention provides a pressure operated water valve comprising a housing having a water conduit including a valve inlet and a valve outlet, a sealing means between the valve inlet and the valve outlet for alternately permitting water to flow between the valve inlet and the valve outlet and stopping water from flowing between the valve inlet and the valve outlet, an operating pressure chamber, an inlet port connecting the operating pressure chamber and the valve inlet, an outlet port connecting the operating pressure chamber with the valve outlet, and port sealing means for alternately sealing the inlet port and the outlet port, the inlet port comprising a slit. Preferably, the pressure operated valve further includes inlet port cleaning means for causing the water flow through the inlet to wash away particles clinging to the entrance to the slit. Preferably, the inlet port cleaning means comprises the walls of the valve inlet and the walls of the slit, the valve inlet walls being substantially perpendicular to the walls of the slit for a sufficient distance prior to the point where the slit connects with the valve inlet so that the direction of water flow in the valve inlet past the point is substantially perpendicular to the slit axis.

In another aspect the invention provides a pressure operated water valve comprising a housing having a water conduit including a valve inlet and a valve outlet, a sealing means between the valve inlet and the valve outlet for alternately permitting water to flow between the valve inlet and the valve outlet and stopping water from flowing between the valve inlet and the valve outlet, an operating pressure chamber, an inlet port connecting the operating pressure chamber and the valve inlet, an outlet port connecting the operating pressure chamber with the valve outlet, and port sealing means for alternately sealing the inlet port and the outlet port, and inlet port cleaning means for washing away particles clinging to the entrance of the inlet port. Preferably, the inlet port cleaning means comprises the walls of the valve inlet and the walls of the inlet port, the valve inlet walls being substantially perpendicular to the walls of the inlet port for a sufficient distance prior to the point were the inlet port connects with the valve inlet so that the direction of water flow in the valve inlet past the point is substantially perpendicular to the inlet port axis.

In yet another aspect the invention provides a pressure operated water valve comprising a housing having a water conduit including a valve inlet and a valve outlet, a sealing means between the valve inlet and the valve outlet for alternately permitting water to flow between the valve inlet and the valve outlet and stopping water from flowing between the valve inlet and the outlet, valve outlet, an operating pressure chamber, an inlet port connecting the operating pressure chamber and the valve inlet, an outlet port connecting the operating pressure chamber with the valve outlet, and port sealing means for alternately sealing the inlet port and the outlet port, the housing comprising a male portion and a female portion, the male portion being inserted into female portion to form the inlet port. Preferably, the female portion of the housing comprises a cylindrical bore and the male portion comprises a cylindrical pin having a diameter slightly less than the diameter of the cylindrical bore. Preferably, the bore narrows at the end nearest the valve inlet. Preferably, there are a plurality of the bores and a plurality of the pins, each pin located within one of the bores. Preferably, there are four of the bores and four of the pins. Preferably, the valve further includes locating means for accurately locating the male portion within the female portion. Preferably, the locating means comprises a ridge formed on the surface of the male portion.

In still another aspect, the invention provides a pressure operated water valve comprising a housing having a water conduit including a valve inlet and a valve outlet, a sealing means between the valve inlet and the valve outlet for alternately permitting water to flow between the valve inlet and the valve outlet and stopping water from flowing between the valve inlet and the valve outlet, an operating pressure chamber, an inlet port connecting the operating pressure chamber and the valve inlet, an outlet port connecting the operating pressure chamber with the valve outlet, and operating pressure chamber sealing means for permitting water to flow into the operating pressure chamber for the short period required to bring the operating pressure chamber to inlet pressure and close the sealing means and for preventing water from entering the operating pressure chamber from the valve inlet at all other times.

In yet a further aspect the invention provides a pressure operated water valve comprising a housing having a water conduit including a valve inlet and a valve outlet, a sealing means between the valve inlet and the valve outlet for alternately permitting water to flow between the valve inlet and the valve outlet and stopping water from flowing between the valve inlet and the valve outlet, an operating pressure chamber, an inlet port connecting the operating pressure chamber and the valve inlet, an outlet port connecting the operating pressure chamber with the valve outlet, and operating pressure chamber sealing means for alternatively opening the inlet port while closing the outlet port and closing the inlet port while opening the outlet port, the operating pressure chamber sealing means comprising: a lever; pivot means for pivotally engaging the lever; a spring; an armature comprising a generally cylindrical sleeve formed out of a magnetically responsive material; a generally cylindrical core enclosed within the sleeve, a sealing member for sealably engaging one of the inlet port and the outlet port, and a lever engaging means for engaging the lever, the core, the sealing member, and the lever engaging means integrally formed of a relatively resilient material. Preferably, the lever engaging means comprises a groove formed in the resilient material. Preferably, the operating pressure sealing means further comprises a guide tube and a spring, the spring and armature carried within the guide tube and, further including a spring locator means for locating the spring within the guide tube, the spring locator means integrally formed with the core.

The invention provides a pressure operated water valve that clogs a thousand times less frequently than prior art pressure operated water valves. Numerous other features, objects and advantages of the invention will become apparent from the following description when read in conjunction with the accompanying drawings.

DESCRIPTION OF THE PREFERRED EMBODIMENT

Figure 1:
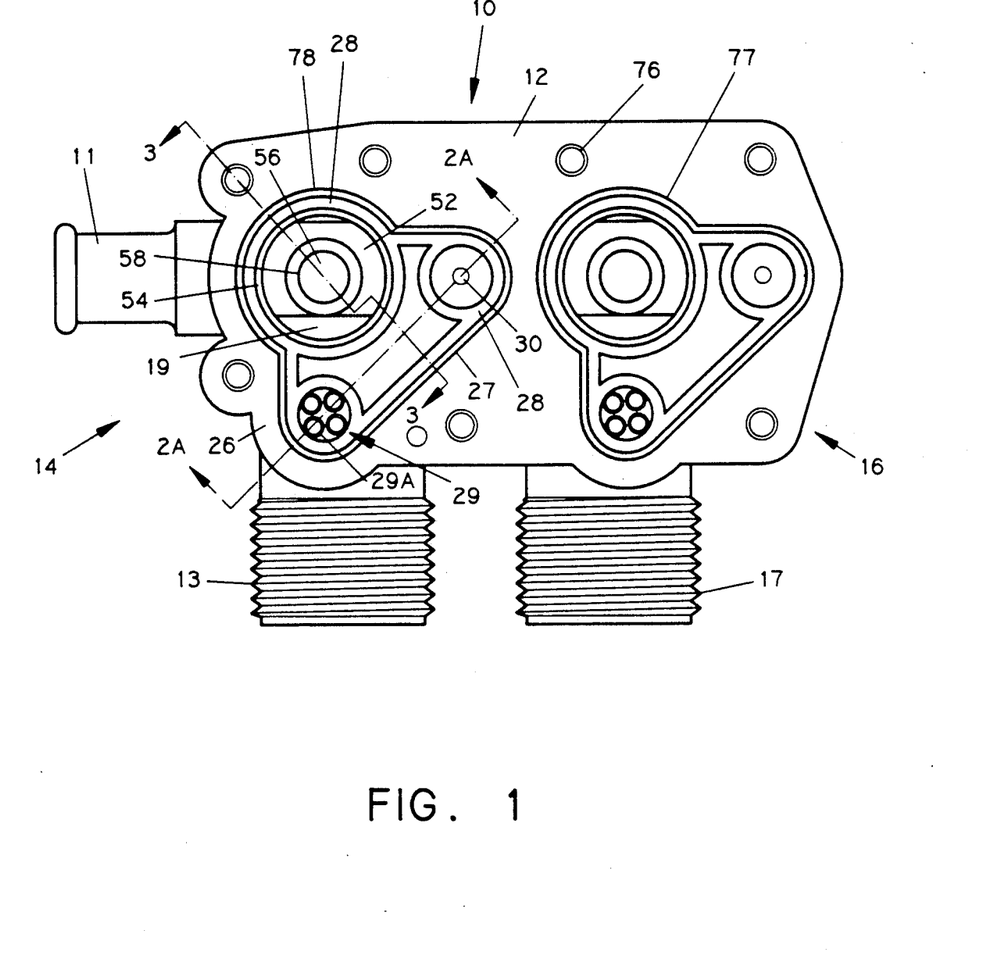
FIG. 1 is a top plan view of the valve body according to the preferred embodiment of the invention.
Figures 2A, 2B:
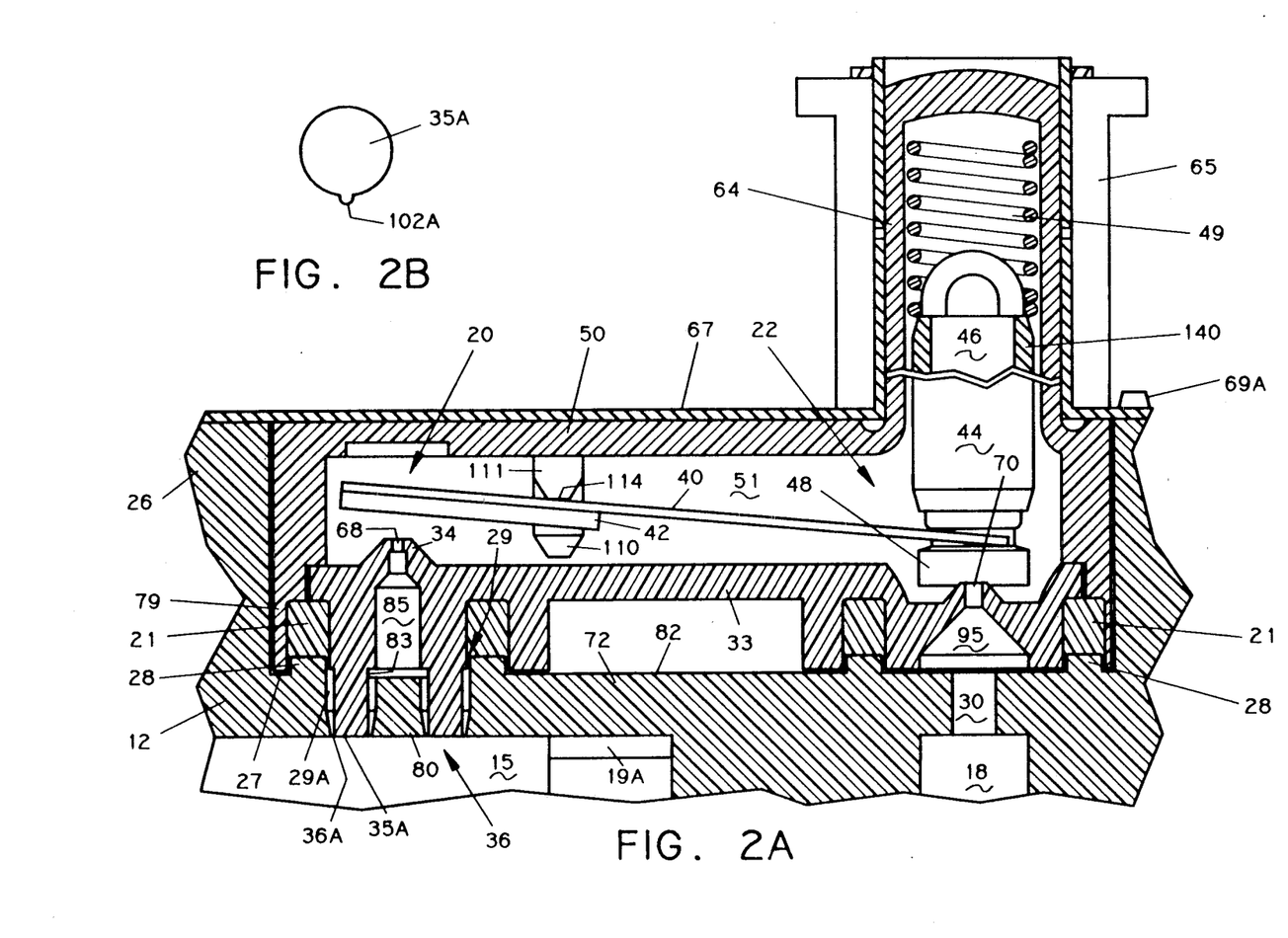
FIG. 2A is a partial cross-sectional view of a valve according to the invention, the portion of the cross-section through the valve body taken through lines 2A—2A in FIG. 1.
FIG. 2B is an enlarged end view of one of the pins of FIG. 2A.
Figure 3:
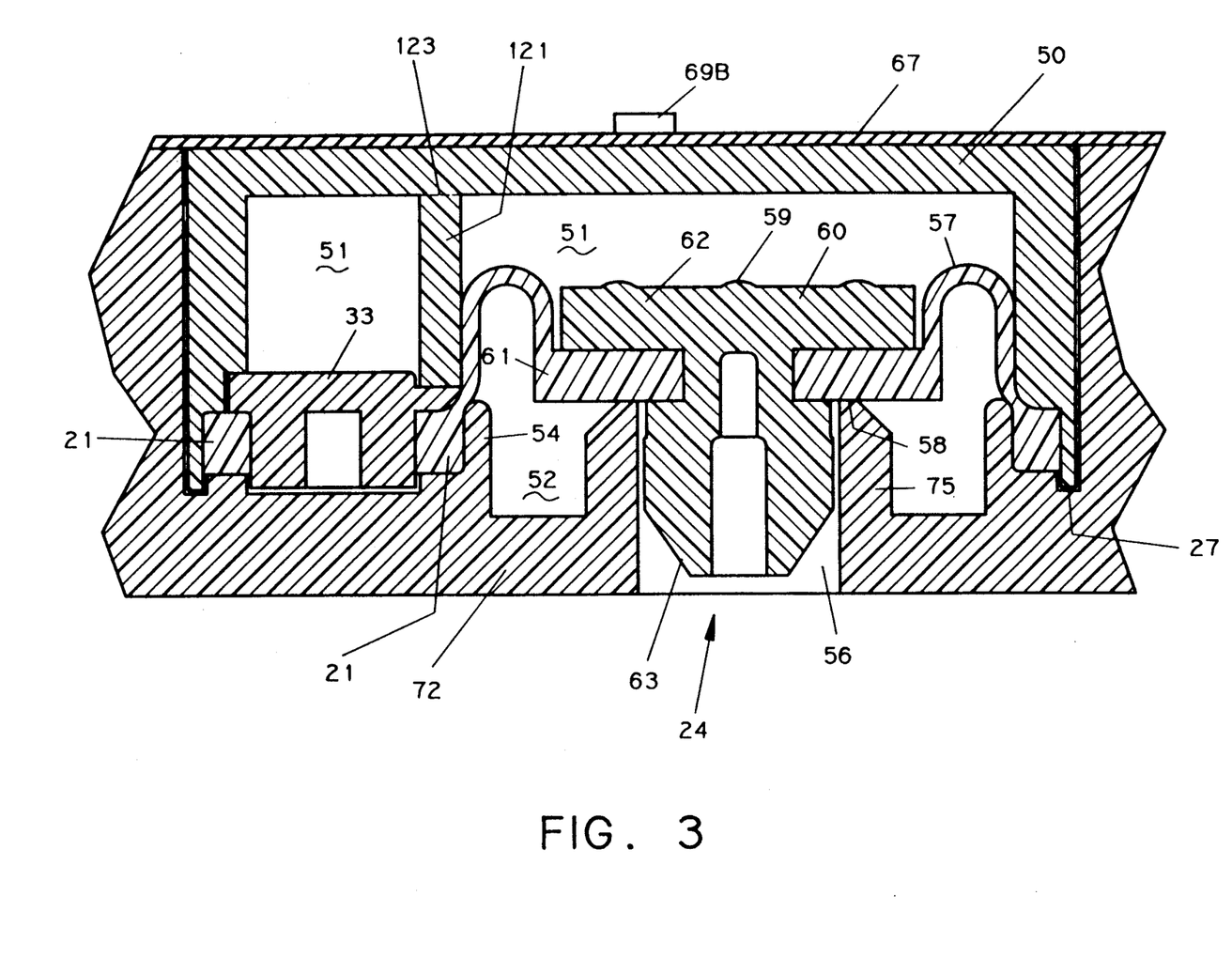
FIG. 3 is a partial cross-section of the valve of FIG. 2A, the portion of the cross-section through the valve body taken through line 3—3 of FIG. 1.

A preferred embodiment of a water valve 10 according to the invention is shown in FIGS. 1, 2A and 3. FIG. 1 shows only the valve body 12 which forms the base for the valve 10; the entire valve can be constructed by placing structures as shown in FIGS. 2A and 3 on the valve body 12, as will be described below. The valve body 12 shown in FIG. 1 is for a double valve 10, as would be used to control the hot and cold water in a clothes washer. It includes a hot water valve 14 having a hot water inlet pipe 15 and a cold water valve 16 having a cold water inlet 17 pipe. Both the valves 14 and 16 share a single outlet pipe 11. Only one of the valves 14 and 16 in the double valve 10 will be described in detail as the other is identical. It should be understood that the embodiment shown and discussed is only one of many possible embodiments of the invention, and is presented by way of illustration only, and is not intended to limit the invention.

The complete structure of the valve 10 can be seen by using the lines 2A—2A and 3—3 for orientation and envisioning the structure of FIGS. 2A and 3 placed on the valve body of FIG. 1. FIG. 2A essentially shows the structure of the pilot valves 20 and 22 while FIG. 3 shows the structure of the main valve 24. Parts of the valve body 12 shown in both FIGS. 1 and 2A include inlet 15, outlet 18, main valve inlet port 19, wall 26, groove 27, rim 28, four operating pressure chamber inlet bores, such as 29A, and operating pressure chamber outlet 30. FIG. 2A also shows pilot valve seat insert 33 which include inlet pilot valve seat 34 and pins, such as 35A, which fit into bores, such as 29A to form operating chamber inlet slits, such as 36A. Insert 33 also includes outlet pilot valve seat 38. FIG. 2A also shows valve lever 40, inlet pilot valve seal 42, armature 44 having armature core 46 which is integrally formed with outlet pilot valve seal 48, spring 49, and operating pressure chamber shell 50 enclosing operating pressure chamber 51. Parts of the valve body shown in both FIGS. 1 and 3 include wall 26, groove 27, rim 28, inlet chamber 52 having outer wall 54, outlet chamber 56, and main valve seat 58. FIG. 3 also shows main valve seal 60 which includes diaphragm 61 and main valve insert 62. Diaphragm 61 has a hinge 57 and a sealing extension 21 integrally formed with it. In addition FIG. 3 shows operating pressure chamber shell 50 enclosing operating pressure chamber 51.

Normally, spring 49 holds pilot valve outlet valve seal 48 closed against pilot valve seat 38 and, via lever 40, pilot valve inlet seal 42 seat away from pilot valve inlet seat 36, leaving operating pressure chamber inlet port 68 open. This causes operating pressure chamber 51 to be at inlet pressure. Since the underside of the central portion of main valve seal 60 is at the lower outlet pressure, the net force on the main valve seal 60 is downward in FIG. 3 and the valve remains closed. When electric power is applied to solenoid coil 65 located just outside guide tube 64, armature 44 rises, closes operating pressure chamber inlet port 68 via lever 40, and opens operating pressure chamber outlet port 70. This causes the operating pressure chamber 51 to fall to the outlet pressure. Since the underside of the outer portion of the main valve seal 60 is at inlet pressure, the main valve seal rises opening the main valve 24. When electrical power is cut off to the solenoid, the operating pressure chamber outlet port 70 is sealed, the operating pressure chamber inlet port 68 is opened, and the operating pressure chamber 51 fills through port 68 until it reaches inlet pressure, which causes main valve 24 to close. Thus water passes through the operating pressure chamber inlet port 68 only during the short period when operating pressure chamber 51 is rising to the inlet pressure. In addition the inlet slits, such as 36A are extremely narrow as compared to their width (which is circular in this embodiment) and are located so that the water flowing through inlet 15 to main valve port 19 tends to wash particles away from them. These improvements to prior pressure operated valves result in 1000 times less clogging in the valves according to the invention.

Turning now to a more detail description of the various parts of the valve 10, valve body 12 is preferably integrally molded out of a suitable plastic, such as polypropylene, but also could be made of a suitable metal, such as brass. It preferably includes a cylindrical inlet 13 pipe (FIG. 1) and a cylindrical outlet 11. The inlet 13 is conventionally threaded while the outlet 11 is conventionally shaped to receive a hose and clamp (not shown). Inlet pipe 13 has a generally cylindrical inlet bore 15 which continues through the wall 26 of valve body 12 to a point just below inlet port 19, where a scoop-like indentation 19A (FIG. 2A) smoothly directs the water upward through the inlet port 19. Inlet port 19 is a semi-arcuate opening passing through wall 72 of valve body 12 in the region between the outer wall of inlet chamber 52 and the wall 75 separating the inlet chamber 52 and outlet chamber 56. Outlet pipe 11 has a generally cylindrical outlet bore 18 which passes through valve body wall 26 and connects with outlet chamber 56 (FIG. 3) and operating pressure chamber outlet 30 (FIG. 2A). The portion of the valve body 12 above the inlet and outlet bores 15 and 18 is a generally solid structure having seven bores, such as 76, for receiving screws, such as 69A and 69B, and two valve cavities 77 and 78. Preferably the bores 76 are self threading. The cavities 77 and 78 are identical so only 78 will be described. Within cavity 78 are formed inlet groove 27 in which the outer lip 79 of operating pressure chamber shell 50 fits to form a seal, rim 28 which compresses an elastomeric extension 21 of the diaphragm 61 to create a hydrostatic seal. Also formed in cavity 78 are cylindrical walls 54 and 75. Wall 54 helps to form the seal for main seal 60 and pilot valve insert, while wall 75 separates inlet chamber 52 from outlet chamber 56. The upper part of wall 75 is wedge-shaped with a narrow ring-shaped main valve seat 58 at its tip. A cylindrical main outlet chamber 56 and a cylindrical operating pressure chamber outlet 30 are also formed in wall 72 of valve body 12. Finally four generally cylindrical bores 29 are formed in wall 72 of valve body 12. Bores 29 are each 0.104 inches in diameter and, starting a distance of 0.055 inches from the bottom, taper in to a diameter of 0.089 inches. The top of the inner pedestal 80 of valve body 12 between the bores 29 is about 0.015 inches below the level of surface 82 (FIG. 2A) which, as we shall see below, creates a channel 83 which connects slits 36 and inlet passage 85.

Figure 4A:
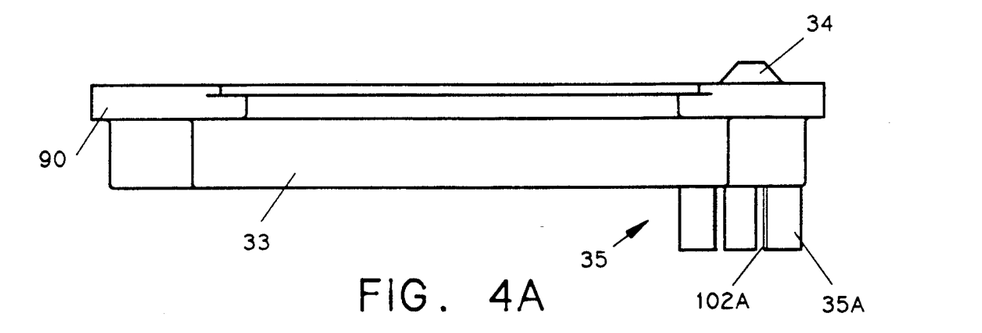
FIG. 4A is a side plan view of pilot seat insert of the valve of FIG. 2A.
Figure 4B:
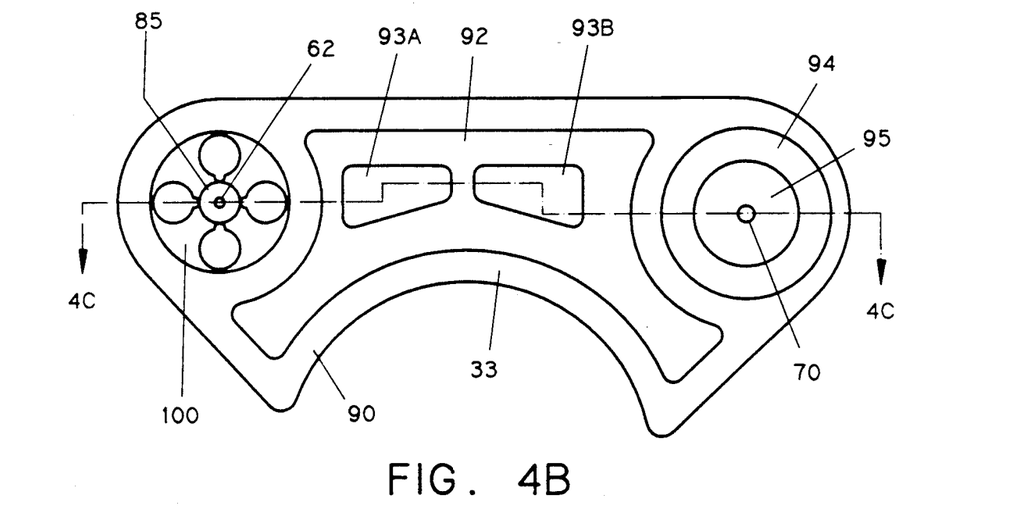
FIG. 4B is a bottom plan view of the pilot seat insert of FIG. 4A.
Figure 4C:
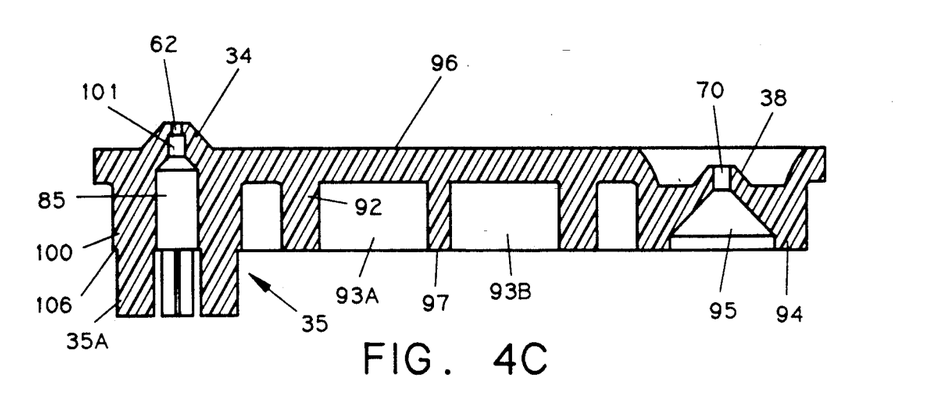
FIG. 4C is a cross-sectional view of the pilot seat insert of FIG. 4A taken through the line 4C—4C of FIG. 4B.

FIGS. 4A through 4C show the pilot valve insert. It is preferably integrally molded of a suitable plastic such as nylon and includes inlet pilot valve seat 34 and outlet pilot valve seat 38. Inlet pilot valve seat 34 is a generally shaped like a frustum of a cone, with a washer-shaped upper surface that has an outer diameter of about 0.05 inches and an inner diameter of about 0.02 inches. Outlet pilot valve seat 38 is similarly shaped with an inner diameter of 0.027 inches and an outer diameter of about 0.047 inches. Insert 33 has an outer flange 90 of about 0.07 inches thick which interacts with shell 50 to locate and seal the insert 33. It also includes a central solid island 92 having several corings 93A and 93B and a generally cylindrical portion 94 having a conical bore 95 that forms a passage between operating pressure chamber outlet port 70 and outlet bore 30. The distance between the upper surface 96 of insert 33 and the lower ends, such as 97, of island 92 and cylindrical portion 94 is the same, about 0.21 inches, and determines the vertical position of insert 33 in cavity 78. Insert 33 also includes a generally cylindrical portion 100 having an outer diameter of about 0.28 inches and a cylindrical inlet bore 85 of about 0.1 inches in diameter. The upper portion of bore 85 tapers inward to meet a short cylindrical segment 101 of about 0.035 inches in diameter which connects with operating pressure inlet port 62. Extending from cylinder portion 100 are four pins 35. Each pin, such as 35A, is a cylinder of about 0.077 inches in diameter. These pins 35 fit into bores 29 in valve body 12 to form slits 36. Formed on each pin is a ridge, such as 102A (FIG. 2B), which is a hemi-cylinder of about 0.01 inches in diameter. The ridge, such as 102A, serves to locate the pin accurately with in its respective bore, such as 29A. As can be seen from the outer diameter of cylinder 100 (0.28 inches), the diameter of bore 85 (0.1) inches, and the diameter of pins 35 (0.077 inches) there is a small shoulder 106 formed where the cylindrical portion 100 meets the pins 35. This shoulder is about 0.210 inches from the top surface 96 of insert 33 or at the same vertical distance from this surface as end 97 of island 92. Since the top of pedestal 80 (FIG. 2A) is about 0.015 inches below the level of surface 82, a small channel 83 is formed to connect the slits 36 and passage 85.

From the dimensions of bores 29 and pins 35 it is seen that slits 36 are circular cylinders of about 0.004 to 0.007 inches in width at their lower end and about 0.25 inches in circumference or length. With four such slits, the total slit length is about an inch, while the slit width is of the order of thousandths of an inch. The small slit width stops very small particles from entering the inlet, and the relatively large slit length allows sufficient flow to rapidly bring the operating pressure chamber up to inlet pressure.

The main valve sealing member 60 is shown in FIG. 3. This member is made of two parts: a diaphragm seal 61 and an insert 62. Diaphragm seal 61 is preferably made of 55-60 durometer, chlorine resistant rubber, but may be made of any suitable flexible material. Insert 62 is preferably made of polypropylene but may be made of any suitable material such as metal or plastic. The diaphragm seal 61 functions to provide a flexible hinge 57 allowing the seal/insert combination to move to seal and unseal the outlet chamber 56, and also acts as the seal material which presses against seat 58. Insert 62 acts as a relatively rigid stabilizer to provide a firm backing to uniformly distribute pressure over the seal 61 and to guide the sealing member smoothly into the outlet chamber 56. Fins 63 on the insert 62 serve to locate and guide the sealing member 60 within chamber 56 and also to provide smooth flow of the water from the inlet to the outlet. Bumps 59 on the top surface of insert 62 allow water to get behind the insert when it is in the fully up position in order to close the valve. The sealing member 60 is otherwise similar to conventional seals used in the prior art and thus will not be discussed in further detail.

Figure 5:
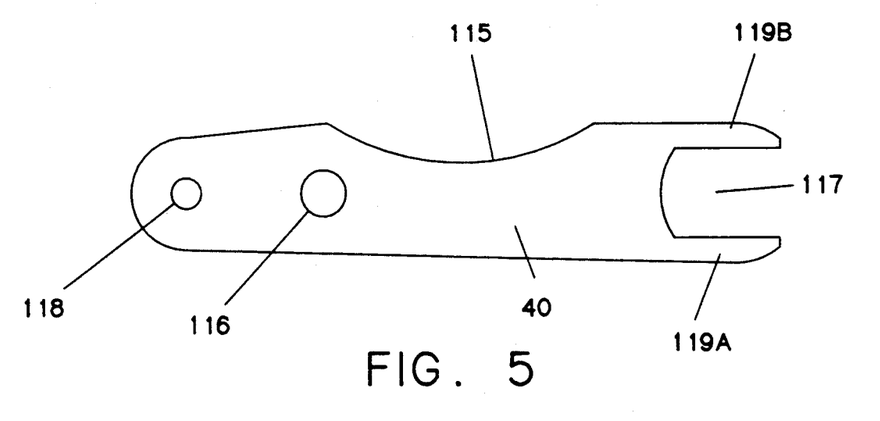
FIG. 5 is a top plan view of the valve lever of the valve of FIG. 2A.

A plan view of the pilot valve lever 40 is shown in FIG. 5. while a side view is shown in FIG. 2A. Lever 40 preferably is a thin piece of spring tempered stainless steel about 0.018 inches thick and about 1.3 inches long and about 0.274 inches wide at its widest point. Its left end in FIG. 5 is rounded in an arc of about 0.110 inches radius and a hole 118 of about 0.06 inches diameter is formed about 0.11 inches in from the end along the center line. This hole 118 is optional and may be used to attach an optional sealing member directly to the lever. About 0.275 inches from hole 118 along the centerline, a second hole 116 of about 0.09 inches diameter is formed. An arc 115 of radius 0.49 inches radius is cut out of the side about another 0.274 inches in from the left end. A U-shaped yoke having tines 119A and 119B is formed at the right end of lever 40 in FIG. 5. the bottom of the U is of about 0.15 inches radius about a point along the centerline, 0.087 inches from the right end and 0.821 inches from the center of hole 116. The outside end of each tine is rounded in an arc of about 0.137 inches about the same point. The inner side of each tine 119A and 119B is about 0.087 inches from the centerline, and each tine is about 0.05 inches wide.

Figure 6:
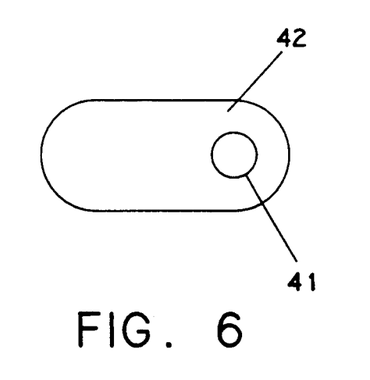
FIG. 6 is a top plan view of the inlet pilot valve seal of FIG. 2A.

A plan view of the inlet pilot valve sealing member 42 is shown in FIG. 6, while a side view is shown in FIG. 2A. It is preferably made of 75-80 durometer, chlorine resistant rubber, but may be made of any other suitable material. This sealing member 42 is made of a higher durometer rubber than the sealing member 48 since the water flow through inlet port 68 tends to push the sealing member 42 away while the water flow through outlet port 70 helps to pull the sealing member 48 toward the port. It is about 0.0625 inches thick and is generally shaped to conform to the shape of the left end of lever 40, being oblong with parallel sides, its ends rounded in an arc of about 0.11 inches radius, and, 0.385 inches from its left end in FIG. 6, having a hole 41 of about 0.09 inches diameter formed along the centerline.

The operating pressure chamber shell 50 is shown in both FIGS. 2A and 3. This shell 50 is preferably made of a plastic such as nylon, but may be made of any suitable material. It functions to locate and seal the pilot valve insert 33 and main valve sealing member 60, and to guide the armature 44. The structure that performs these functions is conventional and will not be discussed in detail. Shell also incudes a post 110 which locates and provides a pivot for lever arm 40. Post 110 extends about 0.28 inches from the top surface of shell 50 and is about 0.08 inches in diameter. Its distal tip is shaped like a frustum of a cone with sides sloping at a 30 degree angle to a diameter of 0.04 inches at the tip. Integrally molded with the post 110 is a flange 111. The distal tip 114 of flange 111 extends about 0.17 inches from the top surface of shell 50 and the sides of the tip slope at a 45 degree angle from the width of the post 110 to a flat surface that is 0.02 inches wide. Flange 111 extends to approximately the width of lever 40 in the directions in and out of the paper in FIG. 2A. Post 110 fits into hole 116 of lever 40 and hole 41 of sealing member 42 so that both pieces move easily with little play. The flat tip 114 of flange 111 provides a fulcrum on which lever 40 pivots. The sealing member 42 is held in place by the post 110, lever 40, and shell 50 which have dimensions such that member 42 is trapped in position. It is noted that there is an slot through wall 121 (FIG. 3) of shell 50, which slot is indicated by the dotted line 123. This slot connects the two portions of operating pressure chamber 51 on either side of the wall 121.

Figure 7A:
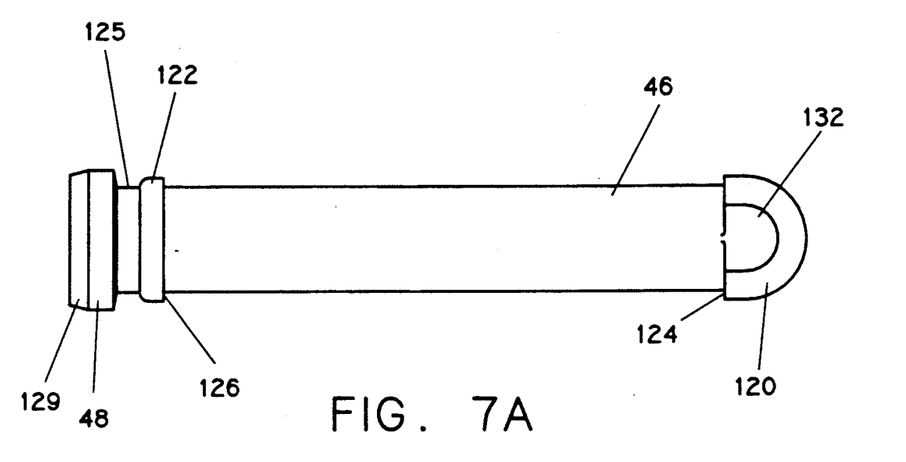
FIG. 7A is a side plan view of the armature core of the valve of FIG. 2A.
Figure 7B:
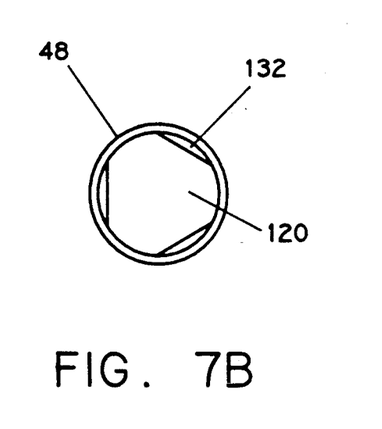
FIG. 7B is a top plan view of the armature core of FIG. 7A.
Figure 8:
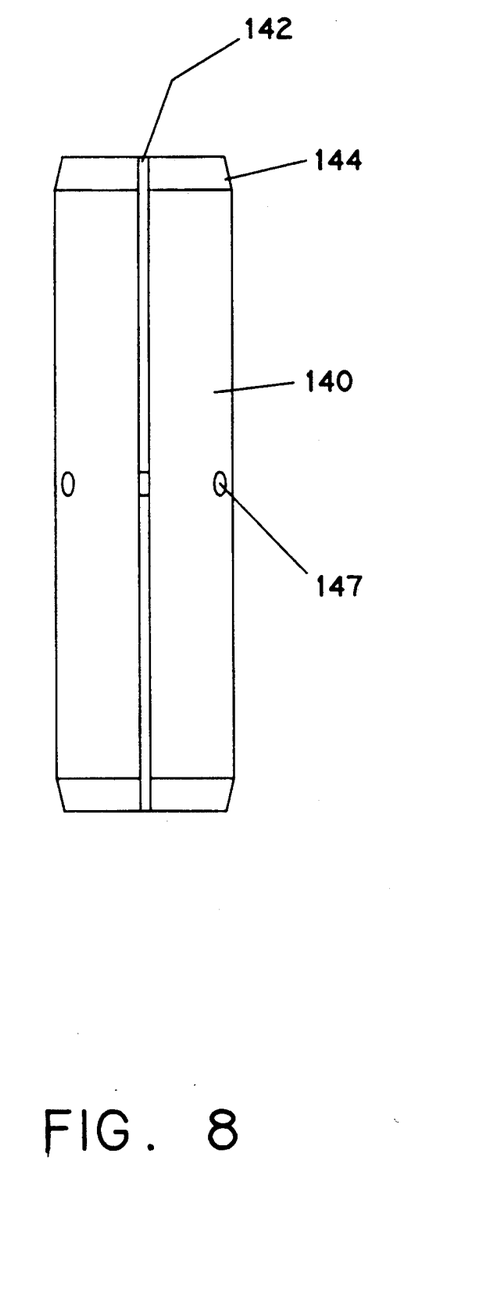
FIG. 8 is a side plan view of the armature cylinder of the valve of FIG. 2A.

Armature 44 is shown in FIG. 2A. It comprises two parts: armature cylinder 140, which is shown in FIG. 8 and armature core 46 which is shown in FIGS. 7A and 7B. Armature cylinder 140 is made of a piece of approximately 0.0355 inch thick magnetically responsive or ferromagnetic material such as magnetic stainless steel which is rolled into a tube that is about 0.89 inches long and 0.265 inches in diameter having a gap 142 about 0.06 inches wide. Its ends, such as 144, are beveled from a distance of about 0.045 inches from the end to a tip thickness of about 0.025 inches. Core 46 is pushed through it, and then it is crimped down to about 0.243 inches in diameter, nearly closing the gap 142 to about 0.02 inches. Cylinder 144 has three dimples, such as 147, which are made by a semi-perforation operation, extend about 0.0175 inches radially into the central area of the cylinder 140, and press into core 46 to lock the cylinder to the core when the cylinder is crimped. Core 46 is preferably made of a relatively flexible material, such as 55-60 durometer, chlorine resistant rubber, but may be made of other suitable material. It comprises a central core of about 0.165 inches in diameter, a rounded head 120 about 0.13 inches long, a flange 122 about 0.038 inches wide, a groove 125 about 0.037 inches wide, and a sealing member 48 about 0.075 inches long. Sealing member 48 tapers inward at its distal end for a distance of about 0.03 inches at an angle of about 15 degrees. At the end adjacent groove 125, sealing member 48 tapers inward at a 10 degree angle. The diameter of sealing member 48 is about 0.22 inches, the diameter of groove 125 is 0.165 inches, and the diameters of flange 122 and head 120 are about 0.194 inches. The edge of flange 122 adjacent groove 125 is rounded to a 0.014 inch radius. The juncture of the central part of core 46 and flange 122 forms a shoulder 126, while the juncture of head 120 and the central part of core 46 forms a shoulder 124. The distance between these shoulders is about 0.895 inches. After crimping, armature cylinder 140 is trapped between shoulders 126 and 124. Head 120 includes three flats, such as 132, which are about 0.082 inches wide in the plane of FIG. 7B. These flats 132 permit the head 120 to pass the three dimples 147 in armature cylinder 140 as core 46 is being pushed through cylinder 140. Head 120 functions to locate spring 49, holding it centered and away from the sides of the guide tube 64. Groove 125 is designed to receive the tines 119A and 119B of lever 40. The enlarged sealing end 48 of core 46 engages the tines to pull the lever 40 up to initiate the "on" cycle of the valve.

The valve is held together in the conventional fashion by a flange 67 which is part of the solenoid 65 assembly. The top surface of shell 50 is flush with the top surface of valve body 12 and flange 67 lays across these surfaces and is screwed to valve body 12 by screws, such as 69A and 69B (FIGS. 2A and 3) to lock the shell 50, and all the other components that interact with the shell, to the valve body 12.

It is a feature of the invention that the pilot valve inlet port is configured into the shape of a narrow slit, such as 36A, of 0.004 to 0.007 width. This width does not permit the passage of particles large enough to cause internal blockage problems. A further feature is the location of the slit, such as 36A, such that the water rushing through the inlet 15 to the main valve 24 tends to wash off any particles clinging to the slit. Further, with no flow through the slit, such as 36A, between the switching of the valve "on" and "off", there is no tendency for particles to collect at the slits as they might otherwise do. Thus the combination of the slit, the flush slit entry, and the levered pilot valve inlet port closure, results in a valve that is highly resistant to clogging.

It is another feature of the invention that the placement of the hole 116 in lever 40 and pin 111 of shell 50 result in a 3 to 1 mechanical advantage. That is, the force exerted to close port 68 by sealing member 42 is three times the force exerted by the armature 44 on the end of lever 40. This permits the mechanism to close the inlet port 68 against water pressures over 100 psi with armatures similar to those used in the prior art valves.

There has been described a novel pressure operated water valve that is highly resistant to clogging and has many other advantages. It is evident that those skilled in the art may now make numerous uses and modifications of the specific embodiment described, without departing from the inventive concepts. For example, the description is in terms of a dual valve, however the valve may also be used in single valves, triple valves, etc. Or the valves may be made with a wide variety of dimensions and materials. A greater or lesser number of slits 36 may be used. The slits 36 may be configured linearly rather than in circles, or any many other shapes. Different mechanisms to open and close the pilot valve ports 68 and 70 may be employed. Consequently, the invention is to be construed as embracing each and every novel feature and novel combination of features present in and/or possessed by the water valve described.

What is claimed is:

1. A pressure operated water valve comprising a housing having a water conduit including a valve inlet and a valve outlet, a sealing means between said valve inlet and said valve outlet for alternately permitting water to flow between said valve inlet and said valve outlet and stopping water from flowing between said valve inlet and said valve outlet, an operating pressure chamber, an inlet port connecting said operating pressure chamber and said valve inlet, an outlet port connecting said operating pressure chamber with said valve outlet, and port sealing means for alternately sealing said inlet port and said outlet port, said housing comprising a male portion and a female portion comprising a cylindrical bore said male portion comprising a cylindrical pin having a diameter slightly less than the diameter of said cylindrical bore, and which narrows at the end nearest said valve inlet and being inserted into said female portion to form said inlet port.

2. A pressure operated water valve as in claim 1 wherein there are a plurality of said bores and a plurality of said pins, each pin located within one of said bores.

3. A pressure operated water valve according to claim 1 wherein there are four of said bores and four of said pins.

4. A pressure operated water valve as in claim 1 and further including locating means for accurately locating said male portion within said female portion.

5. A pressure operated water valve as in claim 4 and wherein said locating means comprises a ridge formed on a surface of said male portion.

6. A pressure operated water valve comprising a housing having a water conduit including a valve inlet and a valve outlet, a sealing means between said valve inlet and said valve outlet for alternately permitting water to flow between said valve inlet and said valve outlet and stopping water from flowing between said valve inlet and said valve outlet, an operating pressure chamber, an inlet port connecting said operating pressure chamber and said valve inlet, an outlet port connecting said operating pressure chamber with said valve outlet, and operating pressure chamber sealing means for alternatively opening said inlet port while closing said outlet port and closing said inlet port while opening said outlet port, said operating pressure chamber sealing means comprising:
  a lever;
  pivot means for pivotally engaging said lever;
  a spring;
  an armature comprising a generally cylindrical sleeve formed out of a magnetically responsive material; a generally cylindrical core enclosed within said sleeve, a sealing member for sealably engaging one of said inlet port and said outlet port, and a lever engaging means for engaging said lever; and
  said core, said sealing member, and said lever engaging means formed of a relatively resilient material.

7. A pressure operated valve as in claim 6 wherein said lever engaging means comprises a groove formed in said resilient material.

8. A pressure operated valve as in claim 6 wherein said operating pressure sealing means further comprises a guide tube and a spring, said spring and armature carried within said guide tube and, further including a spring locator means for locating said spring within said guide tube, said spring locator means integrally formed with said core.

* * * * *